March 23, 1948. F. X. GANTER Re. 22,989

WINDOW DRAPE ROD HANGING MEANS

Original Filed March 1, 1943

INVENTOR.
FRANCIS X. GANTER
BY William B. Hall
ATTORNEY.

Reissued Mar. 23, 1948

Re. 22,989

UNITED STATES PATENT OFFICE 22,989

WINDOW DRAPE ROD HANGING MEANS

Francis X. Ganter, Los Angeles, Calif.

Original No. 2,391,150, dated December 18, 1945, Serial No. 477,589, March 1, 1943. Application for reissue December 16, 1946, Serial No. 716,517

18 Claims. (Cl. 160—19)

My invention relates to a curtain or drape rod hanging or supporting means, and such means which may be used in connection with Venetian blinds, and drapery boxes.

One of the principal objects of my invention is to provide means for quickly and easily hanging a curtain or drape rod, or the drapes or curtains on such rods.

Another important object of this invention is to provide means of this class in which the rod, and the curtains or drapes depending therefrom, are resiliently supported and thereby prevented from being readily distorted when a pull is applied to the curtains or drapes.

An important object also of this invention is to provide novel, simple, and economical means for supporting a U-shaped curtain rod whereby the end portions of a drape or curtain may drape over the edges of Venetian blinds, or the like.

Still another important object of this invention is to provide means of this class for resiliently holding the ends of a U-shaped rod against the window frame or the building wall.

A still further important object of this invention is to provide a supporting means of this class whereby, when a pull is exerted on the drape or curtain, the open side of the supporting hook will be distorted toward the supporting element or wall of the supporting box or concealing cornice, thereby closing the supporting hook.

An important object also of this invention is to provide a novel, simple, and economical clip for performing the above functions.

A further important object of this invention is to provide novel means in connection with such a clip for securely fastening the same to and by the supporting decorative cornice for the drape or curtain.

With these and other objects in view, as will appear hereinafter, I have devised means for supporting a curtain or drape rod having certain novel features of construction, combination, and arrangement of parts and portions, as will be hereinafter described in detail and particularly set forth in the appended claims, reference being had to the accompanying drawings and to the characters of reference thereon, which form a part of this application, in which:

Figure 1:
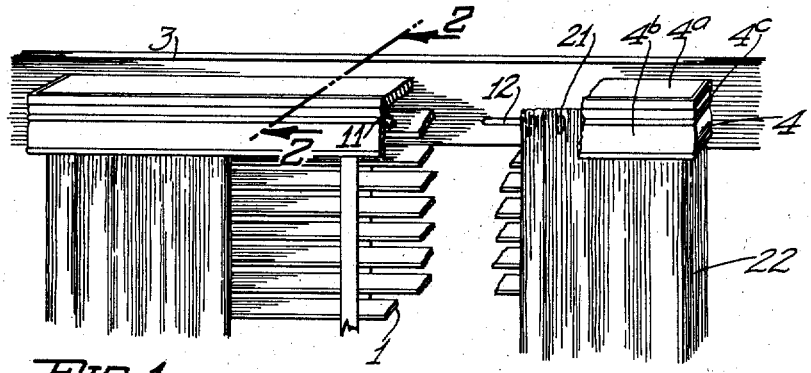
Fig. 1 is a fragmentary perspective view of the curtain or drape supporting cornice for a window, housing my curtain or drape rod supporting means, portions being broken away and in section to facilitate the illustration.

It is customary, in using Venetian blinds for windows, to suspend the Venetian blinds, designated 1 in the drawing, from brackets 2 supported, either directly on the upper rail of a window casing or frame 3, or from a box-like cornice 4 secured to and built outwardly from the upper rail of the window frame, as shown in the drawing. It is also customary, when using curtains or drapes in connection with the Venetian blinds, to hang the curtains or drapes at the room side of the Venetian blinds from a suitable support above or in front of the Venetian blind, or from and within such cornice construction. My present invention, as illustrated in the drawings, shows the hanging of the curtains or drapes in such position from within the box-like cornice as now used.

My supporting means consists primarily of a plurality of thin resilient metal clips 11, each being made preferably of strips or bands of spring steel. One end of the clip has a securing portion $11^a$. From one end of the securing portion the clip is bent at an obtuse angle, as indicated by $11^b$. This angular portion is provided at the end, opposite the securing portion $11^a$, with a hook $11^c$. From the securing portion $11^a$ is struck a pair of prongs $11^d$, these prongs extending to the same side of the plane of the securing portion $11^a$ as the angular portion $11^b$.

Figure 2:
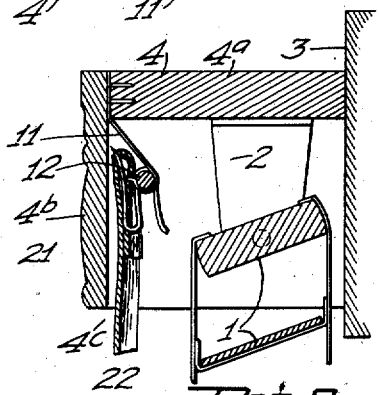
Fig. 2 is a sectional elevational view thereof, taken through 2—2 of Fig. 1.
Figure 4:
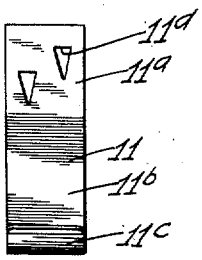
Figure 5:
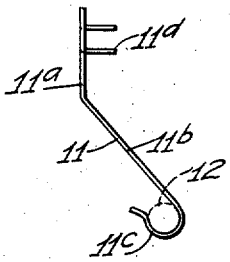

In mounting the clips, or rod supporting brackets, the securing portion $11^a$ is fastened to the outer edge of the upper element or wall member $4^a$ of the box or cornice 4, while the latter is being constructed, with the prongs $11^d$ forced into such edge of this member $4^a$. The clip or bracket is securely held in position by the outer element or wall member $4^b$ of the box or cornice, as shown best in Fig. 2 of the drawing. It will be noted that when so secured, the hook $11^c$ is spaced inwardly from the inner side of the side element $4^b$ of the box or cornice, but it is positioned on the inner side of the angular portion or arm $11^b$, so that the hook is forced against the element or wall member $4^b$ if force is exerted on the drape, thereby closing the hook and preventing the rod, held thereby, from leaving the hook.

Figure 3:
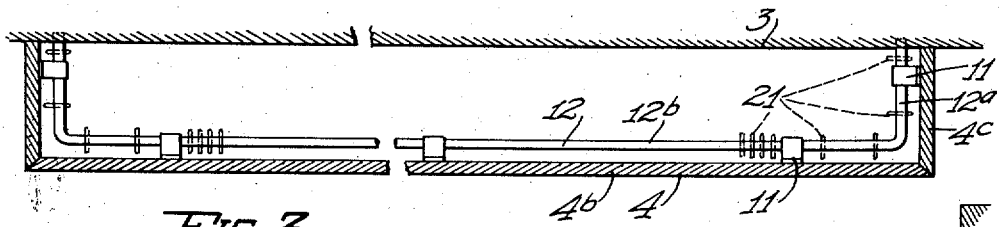
Fig. 3 is a sectional view in plan showing the relation of the rod and supporting clips with respect to the side and end walls of the box-like cornice; and, Figs. 4 and 5 are, respectively, side and edge views of one of the curtain or drape rod supporting clips.

The curtain or drape rod, shown and indicated 12 in the drawing, is U-shaped and is located within the box or cornice, with its legs $12^a$ adjacent the end elements or wall members $4^c$ of the box or cornice, and with the long connecting portion $12^b$ immediately inwardly from the front or long wall member $4^b$. The connecting portion $12^b$ of the curtain or drape rod is shown as supported by three clips while each leg $12^a$ is shown as supported by one clip. In supporting the drape rod on the brackets, the rod is placed within the box or cornice and merely snapped into the hooks $11^c$. It is, thus, resiliently held in position. The curtain or drape rod is resiliently held by the clips in such a manner that the ends of the legs $12^a$ are forced into engagement with the window frame 3 by the clips supporting the long or connecting portion $12^b$ of the rod, the dotted lines in Fig. 3 indicating the normal position of the rod if not limited by the window frame. Such engagement of the legs $12^a$ of the rod 12 tends to retain the curtain supporting hooks 21, near the ends of the legs $12^a$ thereon.

The usual manner of supporting drapes on rods is by pinning wire hooks to the hem portion at the top of the drape and hanging such hooks on the drape rod. The same method may be employed in this instance, and the hooks, designated 21, at the upper edge of the drapes 22 are hooked over the rod 12. The clips 11 provide suitable spacing and retention for such hooks over the rod so that the drapes are retained in the intended positions. The hook placed over the end portions of the drape rod will be prevented from passing beyond the ends of the rod by reason of the end portion of the latter being resiliently held against the window frame.

I wish it to be understood that I do not desire to be limited to the exact details of construction shown and described, for obvious modifications will occur to a person skilled in the art.

I claim:

1. In a means of the class described, a relatively flat horizontal support, and a plurality of resilient brackets, each secured at one end to the outer edge of the support, and the opposite end extending angularly and downwardly therefrom, said opposite end of each bracket having a hook portion for supporting a curtain rod.

2. In a means of the class described, a box-like cornice, and a plurality of brackets, each secured at one end to the inner side of a side wall member of the cornice and the opposite end extending angularly and downwardly therefrom, said opposite end of each bracket having a hook portion for supporting a curtain rod.

3. In a means of the class described, a box-like cornice, and a plurality of resilient brackets, each secured at one end to the inner side of a side wall member of the cornice and the opposite end extending angularly and downwardly therefrom, said opposite end of each bracket having a hook portion for supporting a curtain rod, the hook portions being open toward the wall member of the cornice to which the brackets are secured.

4. In a means of the class described, the combination with a wall, of a support secured relative to and extending outwardly from the wall, a plurality of clips, each secured at one end to the other portion of the support, other clips secured at one end to the end portions of the support, the opposite ends of the clips having rod supporting means, and a U-shaped rod supported on the supporting means at the extended ends of the clips, the first mentioned clips resiliently forcing the ends of the legs of the U-shaped rod against the wall.

5. In a means of the class described, the combination with a wall, of a support secured relative to and extending outwardly from the wall, a plurality of clips, each secured at one end to the outer portion of the support, other clips secured at one end to the end portions of the support, the opposite ends of the clips having hook portions, and a U-shaped rod supported on the hook portions at the extended ends of the clips, the first mentioned clips resiliently forcing the ends of the legs of the U-shaped rod against the wall.

6. In a means of the class described, the combination with a building wall, of a box-like cornice having an open side and positioned with the open side against the building wall, a plurality of brackets, each secured at one end to the inner side of a side wall member of the cornice, other brackets secured at one end to the inner sides of the end wall members of the cornice, the opposite ends of the brackets having rod supporting means, and a U-shaped rod supported on the supporting means at the extended ends of the brackets.

7. In a means of the class described, the combination with a building wall, of a box-like cornice having an open side and positioned with the open side against the building wall, a plurality of clips, each secured at one end to the inner side of a side wall member of the cornice, other clips secured at one end to the inner sides of the end wall members of the cornice, the opposite ends of the clips having rod supporting means, and a U-shaped rod supported on the supporting means at the extended ends of the clips, the clips secured to the first named wall of the cornice resiliently forcing the ends of the U-shaped rod against the building wall.

8. In a means of the class described, the combination with a building wall, of a box-like cornice having an open side and positioned with the open side against the building wall, a plurality of clips, each secured at one end to the inner side of a side wall member of the cornice, other clips secured at one end to the inner sides of the end wall members of the cornice, the opposite ends of the clips having curtain rod supporting hook portions open toward the wall members of the cornice to which the respective clips are secured, and a U-shaped curtain rod supported on the supporting hook portions at the extended ends of the clips, the clips secured to the first named wall of the cornice resiliently forcing the ends of the U-shaped curtain rod against the building wall.

9. In a means of the class described, a horizontal support, and a resilient clip having at one end an inwardly struck securing prong, said prong being forced into the outer side of the support, and means securing the clip to said support, the opposite end of the clip extending downwardly from the support and provided at the latter end with a rod supporting means.

10. In a means of the class described, a box-like cornice comprising a top wall member and a side wall member secured to the outer edge of the former, and a resilient clip having at one end inwardly struck securing prongs, said prongs being forced into an edge of the top member of the cornice and the side member of the cornice being secured against the outer side of the clip, the opposite end of the clip extending inwardly and angularly from the side member, and provided at the latter end with rod supporting means.

11. In a means of the class described, a box-like cornice comprising a top wall member and a side wall member secured to the outer edge of the former, and a resilient clip having at one end inwardly struck securing prongs, said prongs being forced into the edge of the top member of the cornice and the side member of the cornice being secured against the outer side of the clip, the opposite end of the clip extending inwardly and angularly from the side member, and provided at the latter end with curtain rod supporting hooks open towards the side of the side member.

12. In a means of the class described, a box-like cornice, and a plurality of brackets, each secured at one end to the inner side of a side wall member of the cornice and the opposite end extending angularly and downwardly therefrom, the opposite end of each bracket having means for supporting a rod.

13. In a means of the class described, a box-like cornice having a top wall member and a side wall member secured to the outer edge of the former, and a resilient clip having one end positioned between the edge of the top wall member and the inner side of the side wall member, the secured end of the clip having prongs struck from the secured portion, said prongs being forced into one of said wall members, the opposite end of the clip extending inwardly from the side wall member and provided at the latter end with rod supporting means.

14. In a means of the class described, a relatively flat horizontal support, and a resilient clip secured at one end to the support and adjacent the outer edge thereof, said clip extending angularly downwardly and backwardly from the outer edge, and a hook at the extended free end of the clip for supporting a rod.

15. In a means of the class described, a resilient clip comprising an arm having a securing plate, extending at an angle from one end of the arm, and a rod-supporting hook at the opposite end thereof, said plate and said hook extending toward the opposite sides of the arm.

16. In a means of the class described, the combination with a wall, of a support secured relative to and extending outwardly from the wall, rod-supporting means at the outer portion of the support, clips supported at the inner portion and underside of the support and provided with rod-supporting portions, and a U-shaped rod mounted at its leg-connecting portion on said rod-supporting means and with its legs on the rod-supporting portions of the clips, said rod-supporting means forcing the ends of the legs of the U-shaped rod against the wall.

17. In a means of the class described, the combination with a wall, of a support secured relative to and extending outwardly from the wall, resilient rod-supporting means at the outer portion of the support, clips supported at the inner portion and underside of the support and provided with rod-supporting portions, and a U-shaped rod mounted at its leg-connecting portion on said rod-supporting means and with its legs on the rod-supporting portions of the clips, said rod-supporting means resiliently forcing the ends of the legs of the U-shaped rod against the wall.

18. In a means of the class described, a relatively flat horizontal support, and a resilient clip secured at one end to the support and adjacent the outer edge thereof, said clip extending angularly downwardly from the outer edge, and a hook at the extended free end of the clip for supporting a rod.

FRANCIS X. GANTER.

REFERENCES CITED

The following references are of record in the file of this patent:

UNITED STATES PATENTS

| Number | Name | Date |
|---|---|---|
| 507,443 | Marlin | Oct. 24, 1893 |
| 703,059 | Griffin | June 24, 1902 |
| 1,425,691 | Prigan | Aug. 15, 1922 |
| 1,818,776 | Winthrob | Aug. 11, 1931 |
| 2,149,016 | Godfrey | Feb. 28, 1939 |